(12) United States Patent
Lotter

(10) Patent No.: US 9,397,743 B2
(45) Date of Patent: Jul. 19, 2016

(54) SYSTEM FOR COUPLING WIRELESS REPEATER DONOR AND SERVER UNITS OVER CABLE

(71) Applicant: Nextivity, Inc., San Diego, CA (US)

(72) Inventor: Michiel Petrus Lotter, San Diego, CA (US)

(73) Assignee: Nextivity, Inc., San Diego, CA (US)

( * ) Notice: Subject to any disclaimer, the term of this patent is extended or adjusted under 35 U.S.C. 154(b) by 0 days.

(21) Appl. No.: 14/827,063

(22) Filed: Aug. 14, 2015

(65) Prior Publication Data

US 2016/0050009 A1 Feb. 18, 2016

Related U.S. Application Data

(60) Provisional application No. 62/038,166, filed on Aug. 15, 2014.

(51) Int. Cl.
*H04B 7/155* (2006.01)
(52) U.S. Cl.
CPC .................. *H04B 7/15507* (2013.01)
(58) Field of Classification Search
CPC ............................................. H04B 7/14–7/17
USPC .......................... 455/7–11.1, 14–25; 370/315
See application file for complete search history.

(56) References Cited

U.S. PATENT DOCUMENTS

| 7,519,323 B2 | 4/2009 | Mohebbi |
| 8,081,585 B2 | 12/2011 | Mohebbi |
| 9,130,641 B2 | 9/2015 | Mohebbi |
| 2006/0172781 A1 | 8/2006 | Mohebbi |

*Primary Examiner* — Raymond Dean
(74) *Attorney, Agent, or Firm* — Mintz Levin Cohn Ferris Glovsky and Popeo, P.C.

(57) ABSTRACT

A three hop wireless repeater is disclosed, including a donor unit having transmit and receive antennas for wireless communication with one or more cellular base stations, and a server unit having transmit and receive antennas for wireless communication with the donor unit and with one or more wireless communication devices. The repeater further includes a physical cable interconnect between the donor unit and the server unit. The physical cable interconnect includes a donor unit sleeve having donor unit coupling antennas to inductively couple signals to and from the transmit and receive antennas of the donor unit, and a server unit sleeve having server unit coupling antennas to inductively couple signals to and from the transmit and receive antennas of the server unit.

10 Claims, 2 Drawing Sheets

SYSTEM FOR COUPLING WIRELESS REPEATER DONOR AND SERVER UNITS OVER CABLE

CROSS-REFERENCE TO RELATED APPLICATIONS

This application claims priority to and the benefit of U.S. Provisional Patent Application No. 62/038,166 filed on Aug. 15, 2014, titled, "System for Coupling wireless Repeater Donor and Server Units Over Cable", which is here by incorporated by reference in its entirety

BACKGROUND

Three-hop wireless repeaters are well known and provide numerous benefits over more traditional two-hop repeaters. These include improved coverage areas and higher system gain. A three-hop repeater consists of a donor unit, also called a "network unit," which communicates with a cellular base station, and a server unit, also called a "coverage unit," that communicates with one or more cellular handsets or other communication devices. However, three-hop wireless repeaters can often experience communication issues on any of the three hops, such as low bandwidth, dropped communication, and low throughput.

SUMMARY

In a three-hop wireless repeater, the donor unit and server units need to be connected to each other to relay the signals between the handsets and the base station. This document describes a three hop wireless repeater that utilizes various media, including a wired connection, to connect the donor unit with the server unit, for enhanced performance, and increased speeds.

In this disclosure, a system is described to provide a cable-based link between the donor and server units of a wirelessly connected donor and server unit of three-hop repeater system. The basic design includes a "sleeve" that is designed to fit over the donor and server units and an antenna assembly that is designed and strategically positioned on the sleeve to inductively couple the RF signals emanating from the donor and server units onto a cable such as a copper co-axial cable.

In one aspect, a three hop wireless repeater includes a donor unit having transmit and receive antennas for wireless communication with one or more cellular base stations, and a server unit having transmit and receive antennas for wireless communication with the donor unit and with one or more wireless communication devices. The repeater further includes a physical cable interconnect between the donor unit and the server unit. The physical cable interconnect includes a donor unit sleeve having donor unit coupling antennas to inductively couple signals to and from the transmit and receive antennas of the donor unit, and a server unit sleeve having server unit coupling antennas to inductively couple signals to and from the transmit and receive antennas of the server unit.

In another aspect, a communication system includes a donor unit having transmit and receive antennas for wireless communication with one or more cellular base stations, and a server unit having transmit and receive antennas for wireless communication with the donor unit and with one or more wireless communication devices. The system further includes a donor unit sleeve having donor unit coupling antennas to inductively couple signals to and from the transmit and receive antennas of the donor unit, and a server unit sleeve having server unit coupling antennas to inductively couple signals to and from the transmit and receive antennas of the server unit. The system further includes a physical cable connected between the donor unit sleeve and the server unit sleeve.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

A three-hop wireless repeater includes a donor unit and a server unit. The donor and server units need to be connected to each other to relay the signals between the handsets and the base station. An example of a system using a wireless link to connect the donor and server units is the Cel-Fi® system from Nextivity, Inc., and as described in U.S. patent application Ser. No. 11/369,231, filed Mar. 2, 2006 and entitled "Short-Range Cellular Booster;" U.S. patent application Ser. No. 10/597,119 filed Jul. 12, 2006 and entitled "Short-Range Cellular Booster;" and U.S. patent application Ser. No. 12/015,469, filed Jan. 16, 2008 and entitled "Multi-Hop Booster," the contents of each of which are incorporated by reference herein for all purposes.

In some implementations, a system includes a physical cable-based link between the donor and server units of a wirelessly connected donor and server unit of a three-hop repeater system. The system includes a "sleeve" that is configured to fit over the donor and server units, and an antenna assembly that is configured and strategically positioned on the sleeve to inductively couple the RF signals emanating from the donor and server units onto a physical cable such as a co-axial copper cable. A block diagram of the proposed system is shown in FIG. 1.

Figure 1:
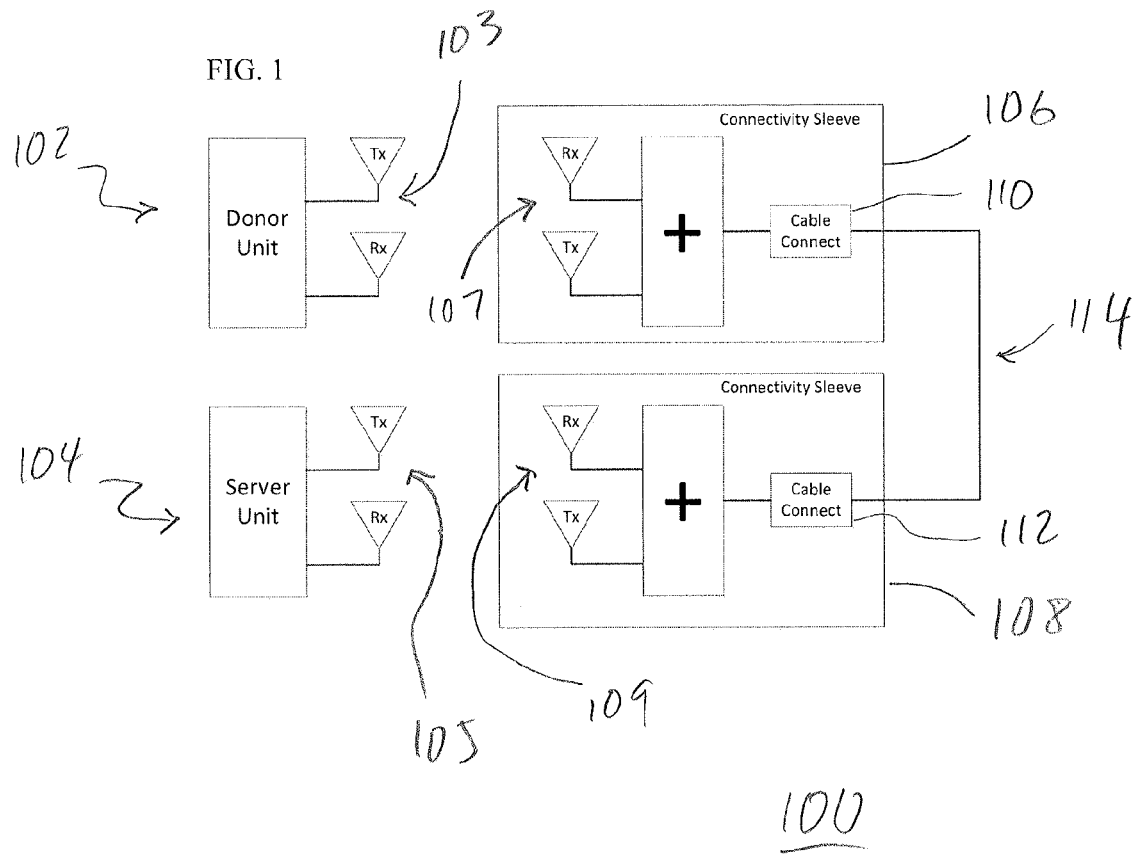
FIG. 1 is a block diagram of a sleeve having a cable connection between donor antenna(s) and server antenna(s) of a wireless repeater.

As shown in FIG. 1, a wireless repeater 100 includes a donor unit 102 and a server unit 104. The donor unit 102 includes transmit and receive antennas 103 for wireless communication with a cellular base station (not shown) and the server unit 104, and the server unit 104 includes transmit and receive antennas 105 for wireless communication with the donor unit 102 and with one or more cellular handsets or other communication devices (not shown).

The wireless repeater 100 further includes a donor unit connectivity sleeve 106 having coupling antennas 107 (transmit and receive) and a server unit connectivity sleeve 108 having coupling antennas 109 (transmit and receive). The coupling antennas 107, 109 are designed and positioned to inductively couple signals to and from transmit and receive antennas 103, 105 of the donor unit 102 and server unit 104, respectively. Each of the connectivity sleeves 106 and 108 includes a cable connector 110 and 112, respectively, for transmitting the signals from the coupling antennas 107, 109 over a physical cable 114. The physical cable 114 can be a copper coaxial cable or other wire-based cable. In alternative implementations, the physical cable can be a fiber optic cable, twisted pair cable, or other physical and conductive medium.

As discussed above, in preferred exemplary implementations, each sleeve 106, 108 contains two antennas to couple the Rx and Tx signals from the donor and server units 102, 104, respectively. The signals to and from these antennas are combined into one signal, typically using a duplexer or combiner circuit. The output of the combiner is then connected to the physical cable 114, which in turn relays the signal to the remote side, i.e. the other of the connectivity sleeves. In some preferred exemplary implementations, as shown in FIG. 1, only passive components are utilized. In alternative implementations, an active system can be employed where low power signals are boosted by an active component such as an amplifier to increase the length of cable that can be used.

Figure 2:
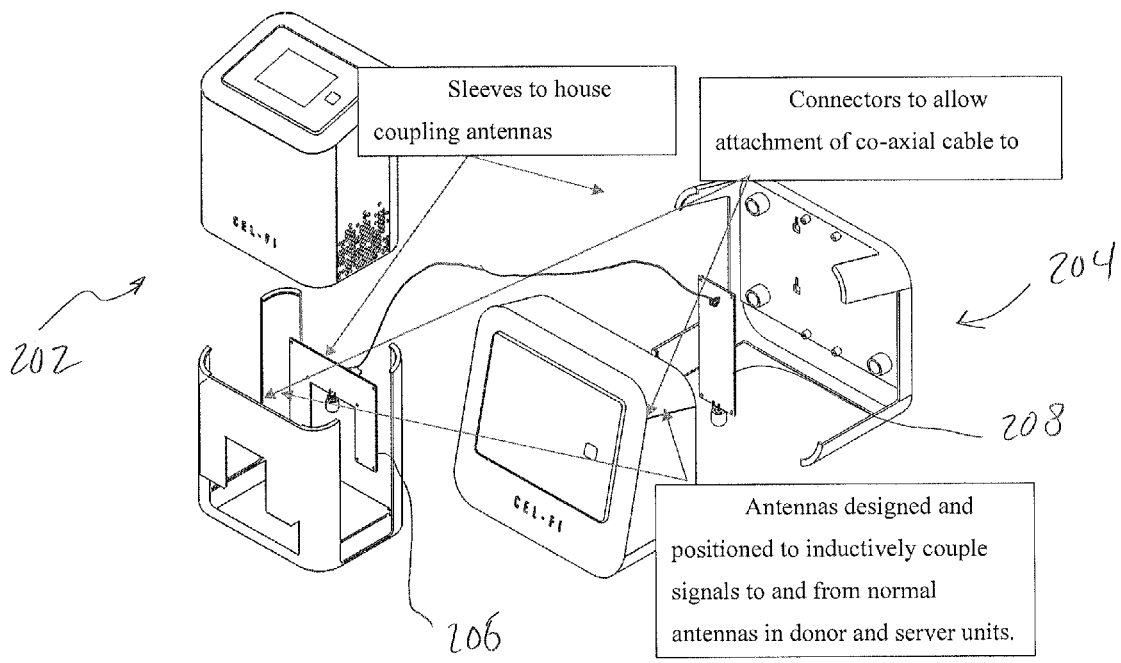
FIG. 2 illustrates a wireless repeater and sleeve with connectors to allow attachment of co-axial cable between donor antenna(s) and server antenna(s).

FIG. 2 illustrates a three-hop repeater system 200 including a donor unit 202 and a server unit 204. The donor unit 202 includes transmit and receive antennas for wireless communication with a cellular base station and the server unit 204, and the server unit 204 includes transmit and receive antennas for wireless communication with the donor unit 202 and with one or more cellular handsets or other wireless communication devices.

In the implementation shown, each of the donor unit 202 and the server unit 204 includes a sleeve 206, 208, respectively, that can house coupling antennas. Connectors allow attachment of co-axial cable to connect donor and server units 202 and 204. The antennas are designed and positioned to inductively couple signals to and from normal antennas in the donor and server units.

Although a few embodiments have been described in detail above, other modifications are possible. Other embodiments may be within the scope of the following claims.

The invention claimed is:

1. A communication system comprising:
    a donor unit having transmit and receive antennas for wireless communication with one or more cellular base stations;
    a server unit having transmit and receive antennas for wireless communication with the donor unit and with one or more wireless communication devices; and
    a physical cable interconnect between the donor unit and the server unit, the physical cable interconnect comprising a donor unit sleeve having donor unit coupling antennas to inductively couple signals to and from the transmit and receive antennas of the donor unit, and a server unit sleeve having server unit coupling antennas to inductively couple signals to and from the transmit and receive antennas of the server unit.

2. The system in accordance with claim 1, wherein the physical cable interconnect includes a donor unit combiner circuit to combine the signals from the transmit antenna of the donor unit.

3. The system in accordance with claim 2, wherein the physical cable interconnect further includes a server unit combiner circuit to combine the signals from the transmit antenna of the server unit.

4. The system in accordance with claim 3, wherein the physical cable interconnect includes a physical cable connected between the donor unit combiner circuit and the server unit combiner circuit.

5. The system in accordance with claim 4, wherein the physical cable includes a coaxial cable.

6. A communication system comprising:
    a donor unit having transmit and receive antennas for wireless communication with one or more cellular base stations;
    a server unit having transmit and receive antennas for wireless communication with the donor unit and with one or more wireless communication devices;
    a donor unit sleeve having donor unit coupling antennas to inductively couple signals to and from the transmit and receive antennas of the donor unit;
    a server unit sleeve having server unit coupling antennas to inductively couple signals to and from the transmit and receive antennas of the server unit; and
    a physical cable connected between the donor unit sleeve and the server unit sleeve.

7. The system in accordance with claim 6, wherein the physical cable includes a coaxial cable.

8. The system in accordance with claim 6, wherein the donor unit sleeve includes a donor unit combiner circuit to combine the signals from the transmit antenna of the donor unit.

9. The system in accordance with claim 8, wherein the server unit sleeve further includes a server unit combiner circuit to combine the signals from the transmit antenna of the server unit.

10. The system in accordance with claim 3, wherein each of the combiner circuits includes a connector for connecting with the physical cable.

* * * * *